US009909427B2

(12) United States Patent
Smith et al.

(10) Patent No.: US 9,909,427 B2
(45) Date of Patent: Mar. 6, 2018

(54) TURBINE AIRFOIL WITH TRAILING EDGE COOLING CIRCUIT

(71) Applicant: General Electric Company, Schenectady, NY (US)

(72) Inventors: Aaron Ezekiel Smith, Simpsonville, SC (US); Gregory Thomas Foster, Greer, SC (US); Michelle Jessica Iduate, Simpsonville, SC (US); Brendon James Leary, Simpsonville, SC (US); David Wayne Weber, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 323 days.

(21) Appl. No.: 14/978,235

(22) Filed: Dec. 22, 2015

(65) Prior Publication Data

US 2017/0175550 A1 Jun. 22, 2017

(51) Int. Cl.
*F01D 5/18* (2006.01)

(52) U.S. Cl.
CPC ........ *F01D 5/187* (2013.01); *F05D 2240/304* (2013.01); *F05D 2260/201* (2013.01); *F05D 2260/203* (2013.01); *F05D 2260/22141* (2013.01); *Y02T 50/676* (2013.01)

(58) Field of Classification Search
CPC ... F01D 5/08; F01D 5/18; F01D 5/182; F01D 5/187; F05D 2240/304; F05D 2260/301; F05D 2260/203; F05D 2260/22141; Y02T 50/676

See application file for complete search history.

(56) References Cited

U.S. PATENT DOCUMENTS 4,278,400 A 7/1981 Yamarik et al.
4,474,532 A * 10/1984 Pazder .................... F01D 5/187 415/115
4,753,575 A * 6/1988 Levengood ............. F01D 5/187 415/115

(Continued)

FOREIGN PATENT DOCUMENTS

EP 0 896 127 A2 2/1999
EP 1 775 420 A2 4/2007
WO 2014029728 A1 2/2014

OTHER PUBLICATIONS

Extended European Search Report and Opinion issued in connection with corresponding EP Application No. 16203705.5 dated Apr. 25, 2017.

*Primary Examiner* — Igor Kershteyn
(74) *Attorney, Agent, or Firm* — Ernest G. Cusick; Hoffman Warnick LLC

(57) ABSTRACT

One aspect of the disclosure provides for a turbine airfoil. The turbine airfoil may include a trailing edge having: a set of cooling channels having a first cooling channel fluidly connected to a second cooling channel; a first section having a first pin bank cooling arrangement, the first section fluidly connected to the first cooling channel; a second section having a second pin bank cooling arrangement, the second section fluidly connected to the second cooling channel and being radially inward of the first section; and a pressure side panel having a third pin bank cooling arrangement, the pressure side panel fluidly connected to the first cooling channel.

20 Claims, 12 Drawing Sheets

(56) References Cited

U.S. PATENT DOCUMENTS

| | | | | |
|---|---|---|---|---|
| 4,767,268 | A * | 8/1988 | Auxier | F01D 5/187 415/115 |
| 5,462,405 | A * | 10/1995 | Hoff | F01D 5/187 415/115 |
| 6,139,269 | A * | 10/2000 | Liang | F01D 5/187 415/115 |
| 6,254,334 | B1 | 7/2001 | Lafleur | |
| 6,402,470 | B1 | 6/2002 | Kvasnak | |
| 6,981,840 | B2 | 1/2006 | Lee et al. | |
| 6,984,103 | B2 | 1/2006 | Lee et al. | |
| 7,011,502 | B2 | 3/2006 | Lee et al. | |
| 7,131,818 | B2 | 11/2006 | Cunha et al. | |
| 7,296,973 | B2 | 11/2007 | Lee et al. | |
| 7,364,405 | B2 | 4/2008 | Cunha et al. | |
| 7,377,746 | B2 | 5/2008 | Brassfield et al. | |
| 7,572,102 | B1 * | 8/2009 | Liang | B22C 9/103 415/115 |
| 7,717,676 | B2 | 5/2010 | Cunha et al. | |
| 7,845,906 | B2 | 12/2010 | Spangler et al. | |
| 7,967,566 | B2 | 6/2011 | Liang | |
| 2005/0084370 | A1 | 4/2005 | Gross | |
| 2012/0269648 | A1 | 10/2012 | Lee | |
| 2014/0033736 | A1 | 2/2014 | Propheter-Hinckley et al. | |
| 2014/0169962 | A1 | 6/2014 | Lee | |
| 2015/0118034 | A1 | 4/2015 | Lee et al. | |

* cited by examiner

TURBINE AIRFOIL WITH TRAILING EDGE COOLING CIRCUIT

FIELD OF THE INVENTION

The subject matter disclosed herein relates to turbomachines. More particularly, the subject matter disclosed herein relates to components within turbomachines such as gas and/or steam turbines.

BACKGROUND OF THE INVENTION

Gas turbine systems are one example of turbomachines widely utilized in fields such as power generation. A conventional gas turbine system includes a compressor section, a combustor section, and a turbine section. During operation of the gas turbine system, various components in the system are subjected to high temperature flows, which can cause the components to fail. Since higher temperature flows generally result in increased performance, efficiency, and power output of the gas turbine system, it may be desirable to cool the components that are subjected to high temperature flows to allow the gas turbine system to operate at increased temperatures.

Turbine blades of a gas turbine system typically contain an intricate maze of internal cooling channels. The cooling channels receive air from the compressor of the gas turbine system and pass the air through internal cooling channels to cool the turbine blades. In the trailing edge of the blades specifically, cold-bridge structure have been employed. These structures exhaust air via trailing edge openings or pressure side bleed openings. While the cold-bridge structures cool, they result in an inefficient use of the air. For example, the pressure side may be sufficiently cooled, however, the suction side is overcooled. Additionally, it is particularly difficult to cool the radially outer tip of the blade, which is typically one of the hottest regions in the trailing edge.

BRIEF DESCRIPTION OF THE INVENTION

A first aspect of the disclosure provides for a turbine airfoil. The turbine airfoil may include a trailing edge having: a set of cooling channels having a first cooling channel fluidly connected to a second cooling channel; a first section having a first pin bank cooling arrangement, the first section fluidly connected to the first cooling channel; a second section having a second pin bank cooling arrangement, the second section fluidly connected to the second cooling channel and being radially inward of the first section; and a pressure side panel having a third pin bank cooling arrangement, the pressure side panel fluidly connected to the first cooling channel.

A second aspect of the disclosure provides for a gas turbine. The gas turbine may include a turbine section; an airfoil within the turbine section, the airfoil including a trailing edge having: a set of cooling channels having a first cooling channel fluidly connected to a second cooling channel; a first section having a first pin bank cooling arrangement, the first section fluidly connected to the first cooling channel; a second section having a second pin bank cooling arrangement, the second section fluidly connected to the second cooling channel and being radially inward of the first section; and a pressure side panel having a third pin bank cooling arrangement, the pressure side panel fluidly connected to the first cooling channel.

A third aspect of the disclosure provides for a trailing edge of a turbine airfoil. The trailing edge including: a trailing edge having: a set of cooling channels having a first cooling channel fluidly connected to a second cooling channel; a first section having a first pin bank cooling arrangement, the first section fluidly connected to the second cooling channel; and a pressure side panel having a second pin bank cooling arrangement, the pressure side panel fluidly connected to the first cooling channel.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawing that depicts various embodiments of the disclosure.

It is noted that the drawings are not to scale. The drawings are intended to depict only typical aspects of embodiments of the disclosure, and therefore should not be considered as limiting the scope of the disclosure. In the drawings, like numbering represents like elements between the drawings.

DETAILED DESCRIPTION OF THE INVENTION

Aspects of the present disclosure provide for a turbine airfoil with a trailing edge cooling circuit. The trailing edge according to aspects of the present disclosure may include a set of cooling channels, a first section of the trailing edge having a pin bank cooling arrangement, a second section of the trailing edge having another pin bank cooling arrangement, and a pressure side panel. In some embodiments, the first section may be at the radially outer end of the trailing edge and may be fluidly connected to a first cooling channel in the set of cooling channels. In this way, cooling fluid is provided to the radially outer tip of the trailing edge earlier on, resulting in cooler fluid being directed toward the radially outer tip of the trailing edge, which is typically one of the hottest portions of the airfoil. Additionally, the pressure side panel balances the heat load between the pressure side and the suction side of the trailing edge of the airfoil. In this way, aspects of the present disclosure provide active direction of cooling fluid where it is most needed in the trailing edge of the airfoil, resulting in the efficient use of the cooling fluid and reducing the overall amount of cooling fluid needed to cool the trailing edge.

In the following description, reference is made to the accompanying drawings that form a part thereof, and in which is shown by way of illustration specific embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
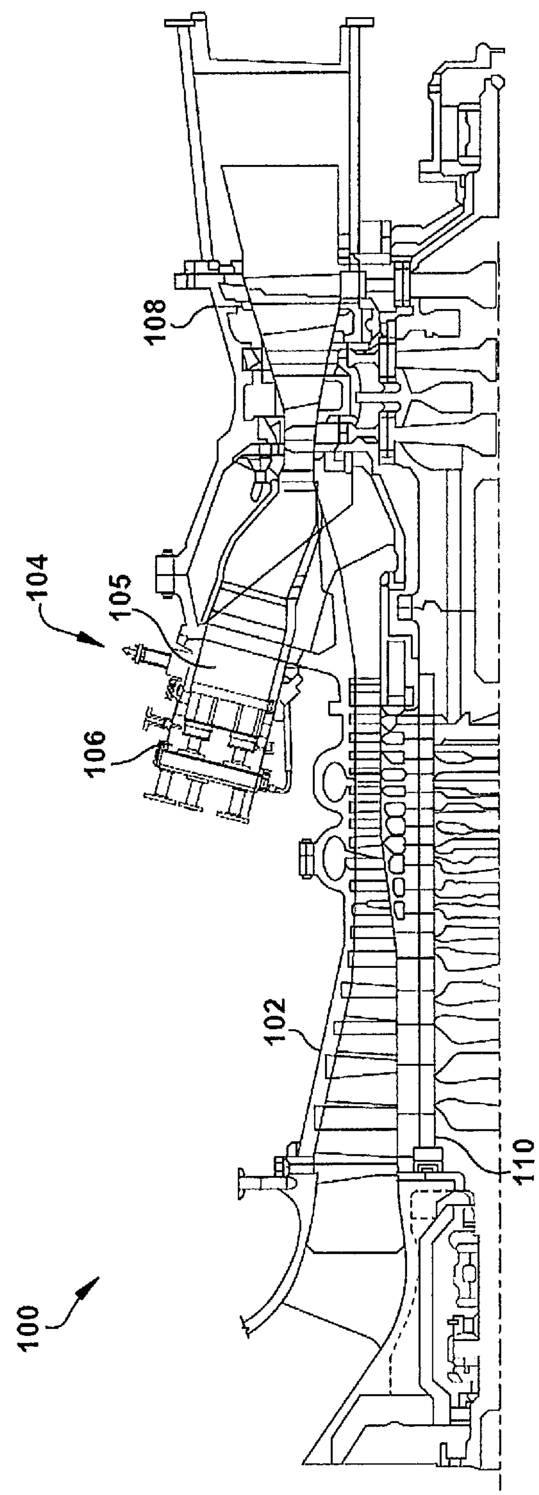
FIG. 1 shows a schematic illustration of an exemplary combustion turbine engine.

FIG. 1 is a schematic illustration of an illustrative turbomachine in the form of a gas turbine system 100. System 100 includes a compressor 102 and a combustor 104. Combustor 104 includes a combustion region 105 and a fuel nozzle assembly 106. System 100 also includes a turbine 108 and a common compressor/turbine shaft 110 (sometimes referred to as rotor 110). In one embodiment, system 100 is a MS7001FB engine, sometimes referred to as a 9FB engine, commercially available from General Electric Company, Greenville, S.C. Embodiments of the disclosure are not limited to any one particular gas turbine engine, and may be implemented in connection with other engines including, for example, the MS7001FA (7FA) and MS9001FA (9FA) engine models of General Electric Company. Further, teachings of the disclosure are not limited to gas turbines, and may be applied to any variety of turbomachine such as steam turbines, jet engines, compressors, etc. As used herein, the terms "axial", "radial" and "circumferential" are used with rotor 110 as the reference structure.

In operation, air flows through compressor 102 and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 for which gas stream thermal energy is converted to mechanical rotational energy. Turbine 108 is rotatably coupled to and drives rotor 110. Compressor 102 also is rotatably coupled to shaft 110. In the illustrative embodiment, there is a plurality of combustors 104 and fuel nozzle assemblies 106.

Figure 2:
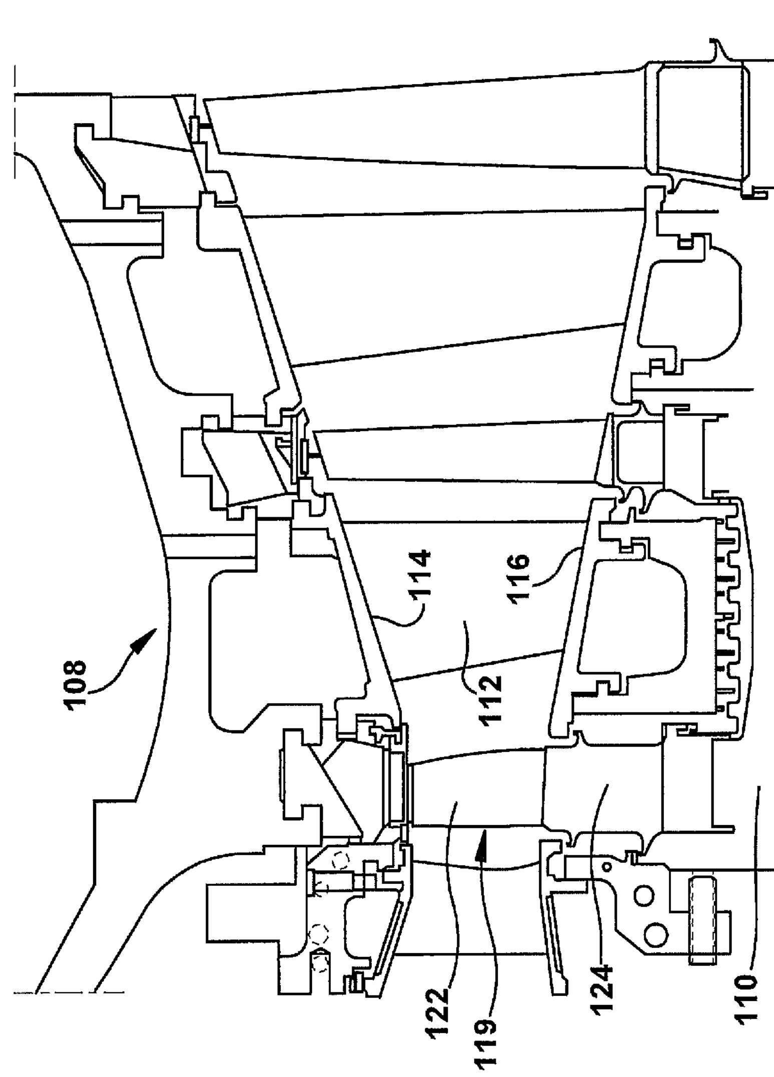
FIG. 2 shows a cross-section illustration of an exemplary gas turbine assembly with a three stage nozzle that may be used with the combustion turbine engine in FIG. 1.

FIG. 2 is a cross-section illustration of an illustrative turbine assembly 108 with a three stage turbine that may be used with gas turbine system 100 in FIG. 1. Turbine assembly 108 includes a vane sub-assembly 112. Vane sub-assembly 112 is held in the turbine assembly 108 by a radially outer platform 114 and a radially inner platform 116. Turbine assembly 108 also includes a rotating blade 119, which may include an airfoil 122 held to rotor 110 by a shank 124. The teachings of the disclosure are typically applied to a rotating blade 119, but may be applied to vane sub-assembly 112 and/or rotating blade 119, which shall be referred to collectively as a "turbomachine blade".

Figure 3:
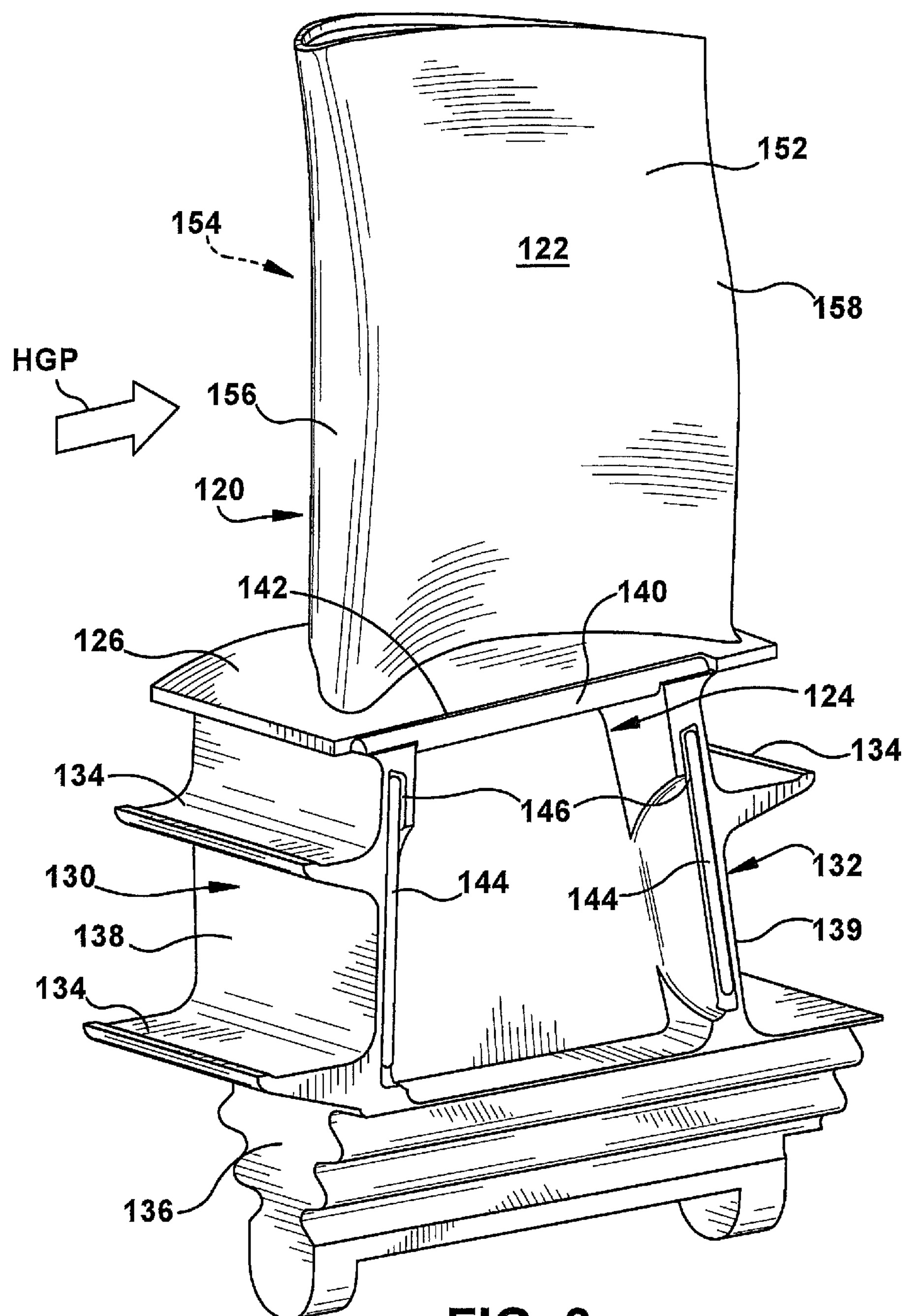
FIG. 3 shows an enlarged perspective view of an illustrative conventional turbomachine blade.

FIG. 3 is a perspective view of an illustrative turbomachine blade 120 (illustrated here as a rotating blade). Turbomachine blade 120 may include airfoil 122 and shank 124. Shank 124 is coupled to airfoil 122 by a platform 126. Shank 124 includes a pair of opposing cover plates 130, 132. Arrow HGP shows the direction of flow in the hot gas path. As indicated by HGP direction, cover plate 130 is an upstream side cover plate, facing towards HGP, and cover plate 132 is a downstream side cover plate, facing away from HGP. One or more angel wings 134 may extend from each cover plate 130, 132. Various forms of connection to either rotor 110 (FIGS. 1-2) or a casing of a turbomachine may be applied depending on how turbomachine blade 130 is employed. In FIG. 3 where the blade is a rotating blade, a dovetail 136 may be provided to couple turbomachine blade 120 to a rotor wheel (not shown). Each turbomachine blade may include a first circumferential face 138 and a second, opposing circumferential face 139, so named as they face in a circumferential direction about rotor 110 (FIGS. 1 and 2). A platform seal pin 140 may be seated in an axially extending platform pin groove 142, and a pair of radial seal pins 144 may be positioned in corresponding radial seal pin grooves 146 in respective cover plates 130, 132, e.g., second circumferential face 139.

Airfoil 122 may include a pressure side 152 and a suction side 154 (obstructed in this view) opposing pressure side 152. Blade 120 can also include a leading edge 156, spanning between pressure side 152 and suction side 154, and a trailing edge 158 opposing leading edge 156 and spanning between pressure side 152 and suction side 154.

Figure 4:
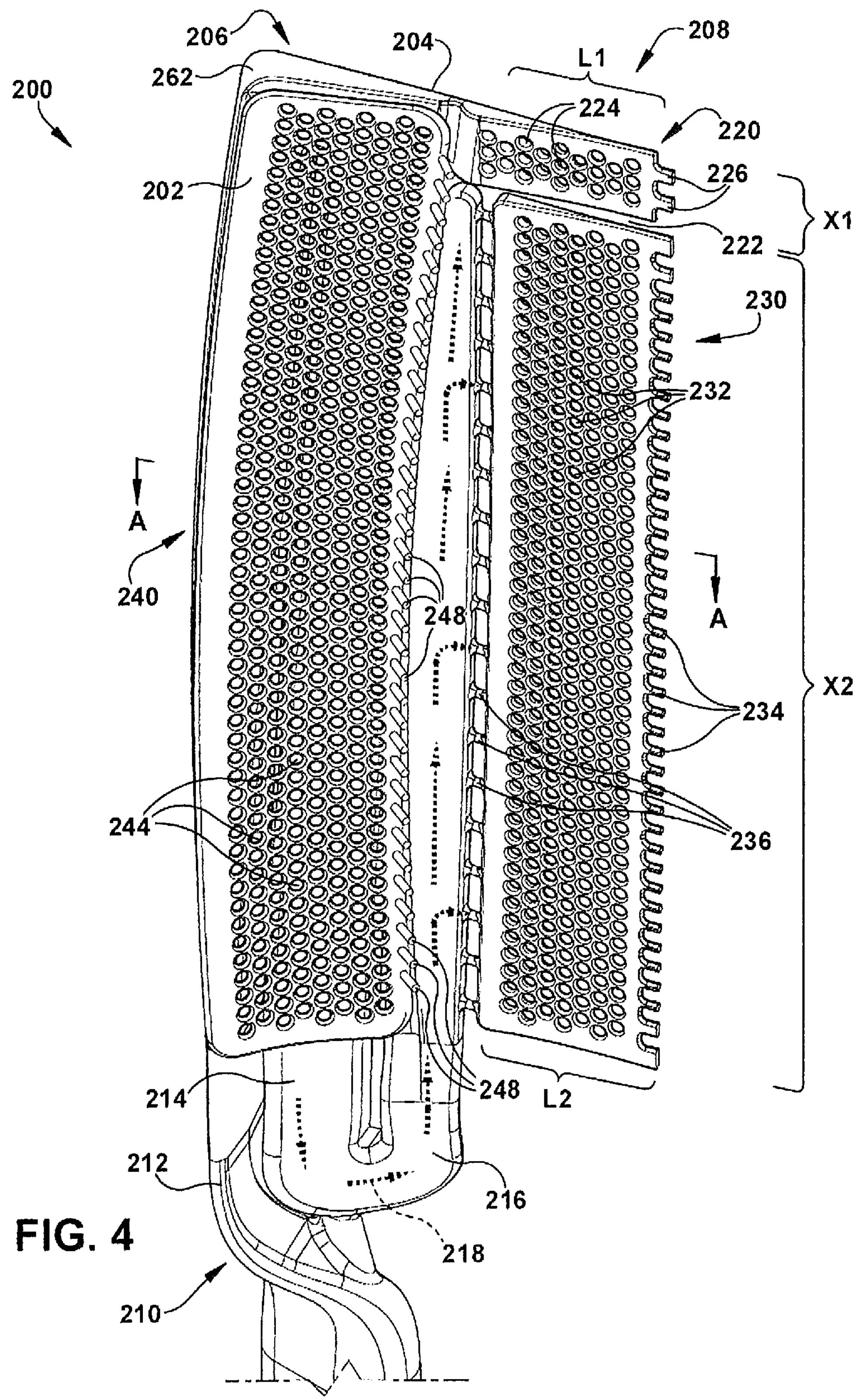
FIG. 4 shows a pressure side view of a cooling circuit within a trailing edge of an airfoil according to embodiments of the disclosure.
Figure 5:
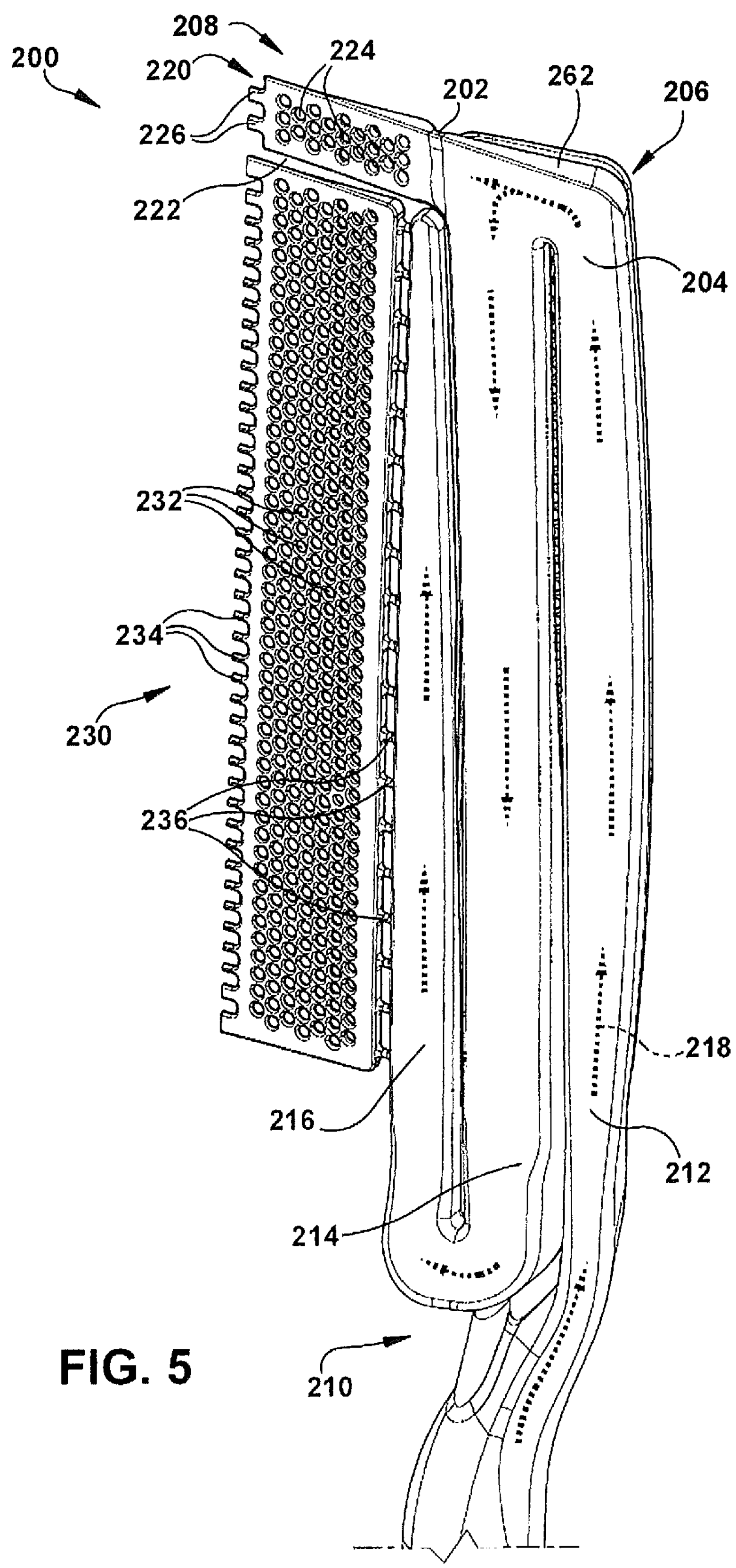
FIG. 5 shows a suction side view of a cooling circuit within a trailing edge of an airfoil according to embodiments of the disclosure.

FIGS. 4-5 show an inner core cooling circuit 200 of a trailing edge 158 (FIG. 3) of airfoil 122 (FIG. 3). More particularly, FIGS. 4-5 show a core used to manufacture trailing edge 158 (FIG. 3). As discussed herein, cooling circuit 200 may include a pressure side 202, a suction side 204, and opposing axial ends 206, 208. FIG. 4 shows a view of cooling circuit 200 facing pressure side 202. FIG. 5 shows a view of cooling circuit 200 facing suction side 204. Axial upstream end 206 may be nearest leading edge 156 (FIG. 3). Axial downstream end 208 may be furthest leading edge 156 (FIG. 3) and may contain outlets as will be described herein. Cooling circuit 200 may be formed via, for example, casting, forging, three-dimensionally printing, etc., using a cast of cooling circuit 200 may be integrally formed with leading edge 156 (FIG. 3) or as a separate component and subsequently joined to leading edge 156 (FIG. 3) via, for example, welding, brazing, bonding or other coupling mechanism.

Cooling circuit 200 may also include a set of cooling channels 210 (e.g., a serpentine cooling circuit), a section 220, a section 230, and a pressure side panel 240. Set of cooling channels 210 is shown as including three cooling channels 212, 214, 216, e.g., a three-pass serpentine cooling circuit. However, it is to be understood that any number of cooling channels can be provided without departing from the aspects of the disclosure. For example, set of cooling channels 210 may only contain two cooling channels in some embodiments, e.g., a 2-pass serpentine cooling circuit. In another example, set of cooling channels 210 may include four cooling channels, e.g., a four-pass serpentine cooling circuit. Cooling channels 212, 214, 216 may supply cooling fluid 218 (shown by dotted arrows) radially along axially upstream end 206 at suction side 204 of trailing edge 158 (FIG. 3). In some embodiments, cooling fluid 218 may include air. In other embodiments, cooling fluid may include any other type of liquid or gas configured to cool trailing edge 158 (FIG. 3). Cooling channels 212, 214, 216 may be fluidly connected to one another. That is, cooling channel 212 may receive cooling fluid 218 from cooling channels (not shown) of leading edge 156 (FIG. 3). Alternatively, cooling channels 212, 214, 216 may receive cooling fluid 218 from some other source configured to supply cooling fluid 218 to airfoil 122 (FIG. 3), e.g., a compressor 102 (FIG. 1).

Still referring to FIGS. 4-5, cooling circuit 200 of trailing edge 158 (FIG. 3) may also include sections 220, 230. Section 230 may be positioned radially inwardly of section 220. Section 230 may be separated from section 220 via wall (or rib) 222. Section 220 may include a pin bank cooling arrangement 224. Section 220 may be fluidly connected to cooling channel 212. Section 220 may have a radial length X1, and section 230 may have a radial length X2. In some embodiments, X1 may be substantially shorter than X2. As such herein, "substantially" refers to largely, for the most part, entirely specified or any slight deviation which provides the same technical benefits of the invention. In a preferred embodiment, X2 may be in the range of approximately 5% to approximately 20% of the total length prescribed by the sum of X1 and X2. Section 230 may include a pin bank cooling arrangement 232. Section 230 may be fluidly connected to cooling channel 216. However, it is to be understood that in embodiments where cooling circuit 200 includes more or less cooling channels than shown in FIGS. 4-5, sections 220, 230 may be fluidly connected to other cooling channels without departing from aspects of the disclosure as described herein. Pin bank cooling arrangements 224, 232 may each include a plurality of spaced pins extending from pressure side 202 to suction side 204 of cooling circuit 200 to provide increased surface area and promote heat transfer. While the present disclosure is described with respect to pin bank cooling arrangements, it is to be understood that any other means of increasing surface area and/or disturb the flow field to promote heat transfer can be employed without departing from aspects of the disclosure. In some embodiments, sections 220 and 230 may include a length longer than conventional trailing edge slots. That is, sections 220 and 230 may each include a length L1, L2 (measured from cooling channel 216 to end of cooling circuit 200) of approximately 0.75 inches to 1.5 inches. As used herein, "approximately" is intended to include values, for example, within 10% of the stated values. Additionally, pin bank cooling arrangements 224, 234 may extend for a majority of lengths L1, L2 of sections 220, 230. In some embodiments, pin bank cooling arrangements 224, 234 may extend to a position that is less than 0.5 inches from axial downstream end 208 of cooling circuit 200. Sections 220, 230 may also include outlets 226, 234 from which cooling fluid 218 may be released from trailing edge 158 (FIG. 3).

Figure 6:
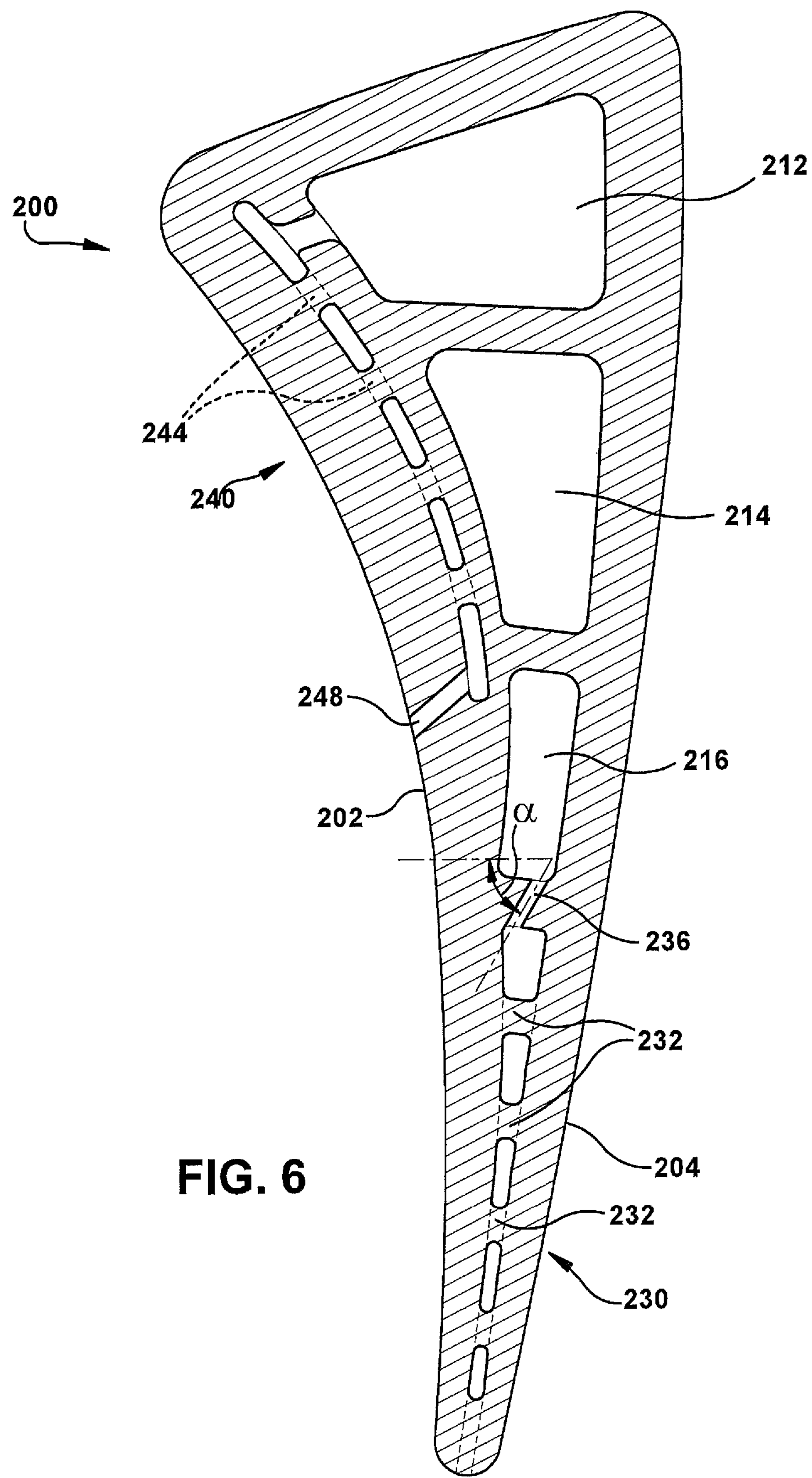
FIG. 6 shows a cross-sectional view of the cooling circuit shown in FIG. 4 along line A-A according to embodiments of the disclosure.
Figure 7:
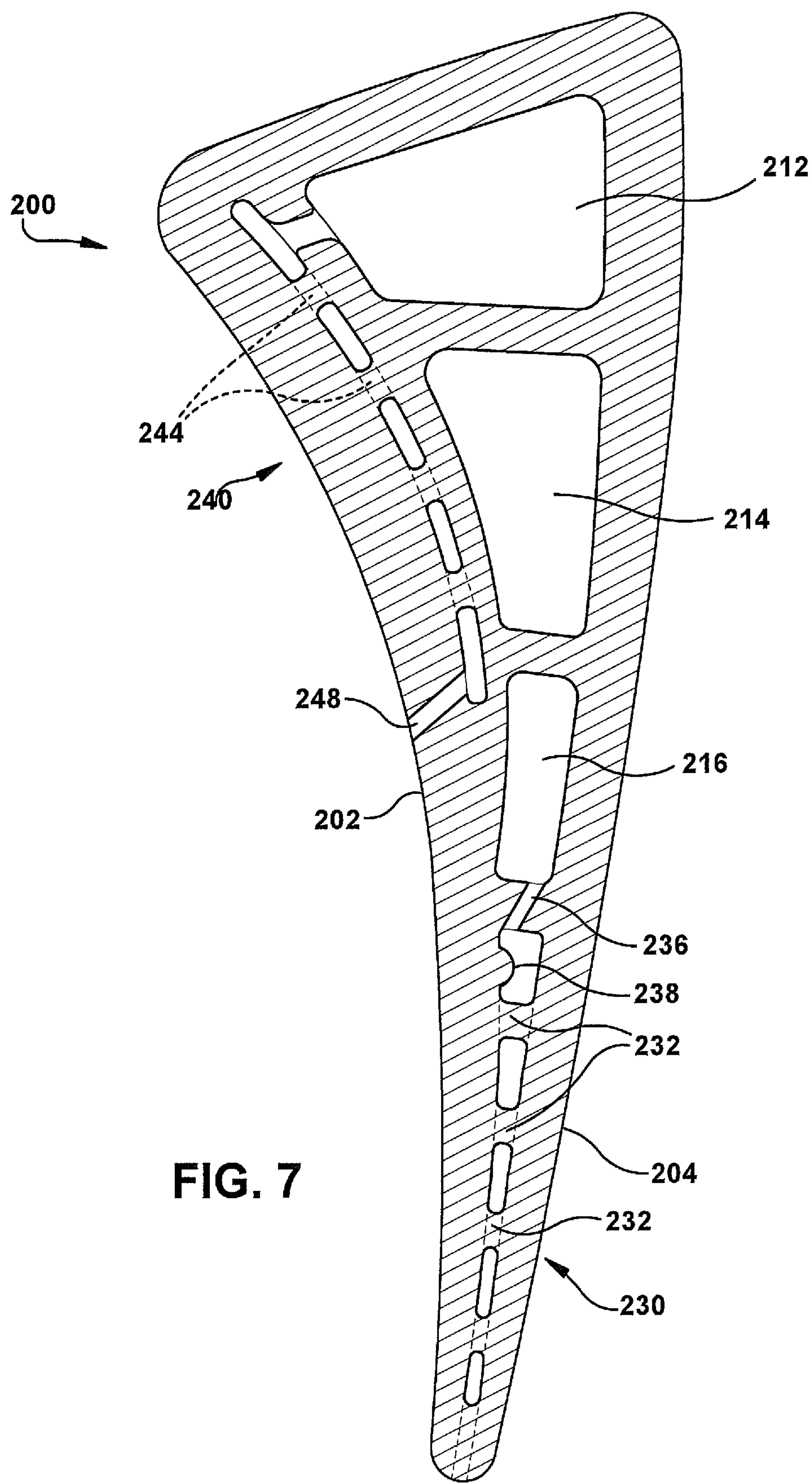
FIG. 7 shows a cross-sectional view of the cooling circuit shown in FIG. 4 along line A-A according to another embodiment of the disclosure.
Figure 8:
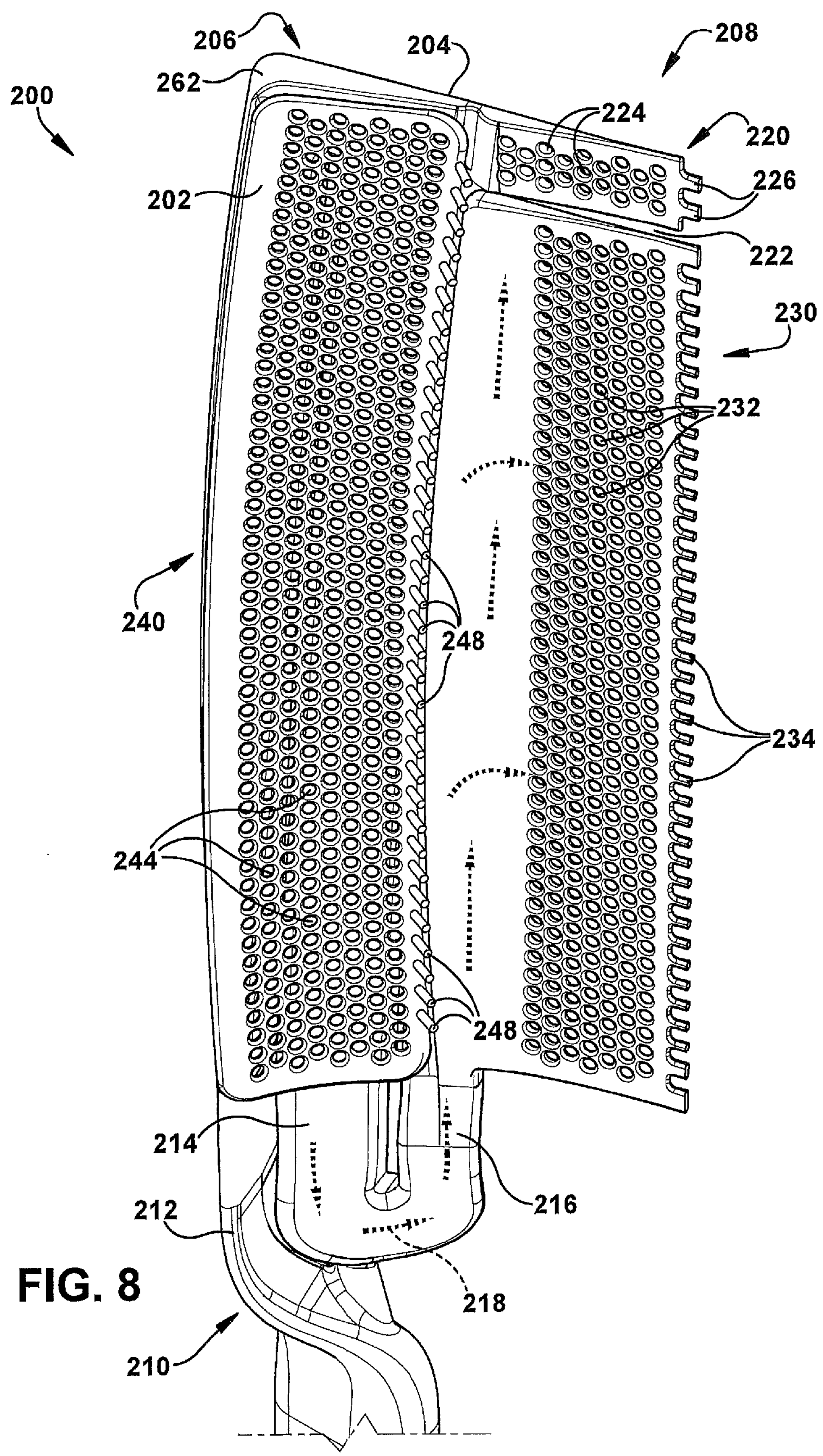
FIG. 8 shows a pressure side view of cooling circuit within a trailing edge of an airfoil according to another embodiment of the disclosure.

In some embodiments, cooling circuit 200 of trailing edge 158 (FIG. 3) may include a set of crossover holes 236 which fluidly connect section 230 to cooling channel 216. FIG. 6 shows a cross-section of trailing edge 158 (FIG. 3) according to one embodiment of the disclosure. In this embodiment, set of crossover holes 236 may be angled toward pressure side 202 as crossover holes 236 extend from cooling circuit 216 to section 230. For example, crossover holes 236 may have an acute angle a, wherein the reference line of which is perpendicular to pressure side 202. Angling crossover holes 236 toward pressure side 202 further provides enhanced cooling on pressure side 202, which is typically hotter than suction side 204. FIG. 7 shows a cross-section of trailing edge 158 (FIG. 3) according to another embodiment of the disclosure. In this embodiment, cooling circuit 200 may further include a set of raised features 238 extending toward suction side 204. That is, each raised feature in set of raised features 238 may correspond to each crossover holes in set of crossover holes 236. Set of raised features 238 provides for increased surface area and further promotes heat transfer and cooling. In some embodiments, raised features 238 may include a single raised feature that extends continuously radially along the entire airfoil. In another embodiment, section 230 may be open to cooling channel 216 as shown in FIG. 8 as opposed to being fluidly connected to cooling channel 216 via crossover holes 236. This embodiment, provides for a more robust core and ease of manufacture.

Figure 9:
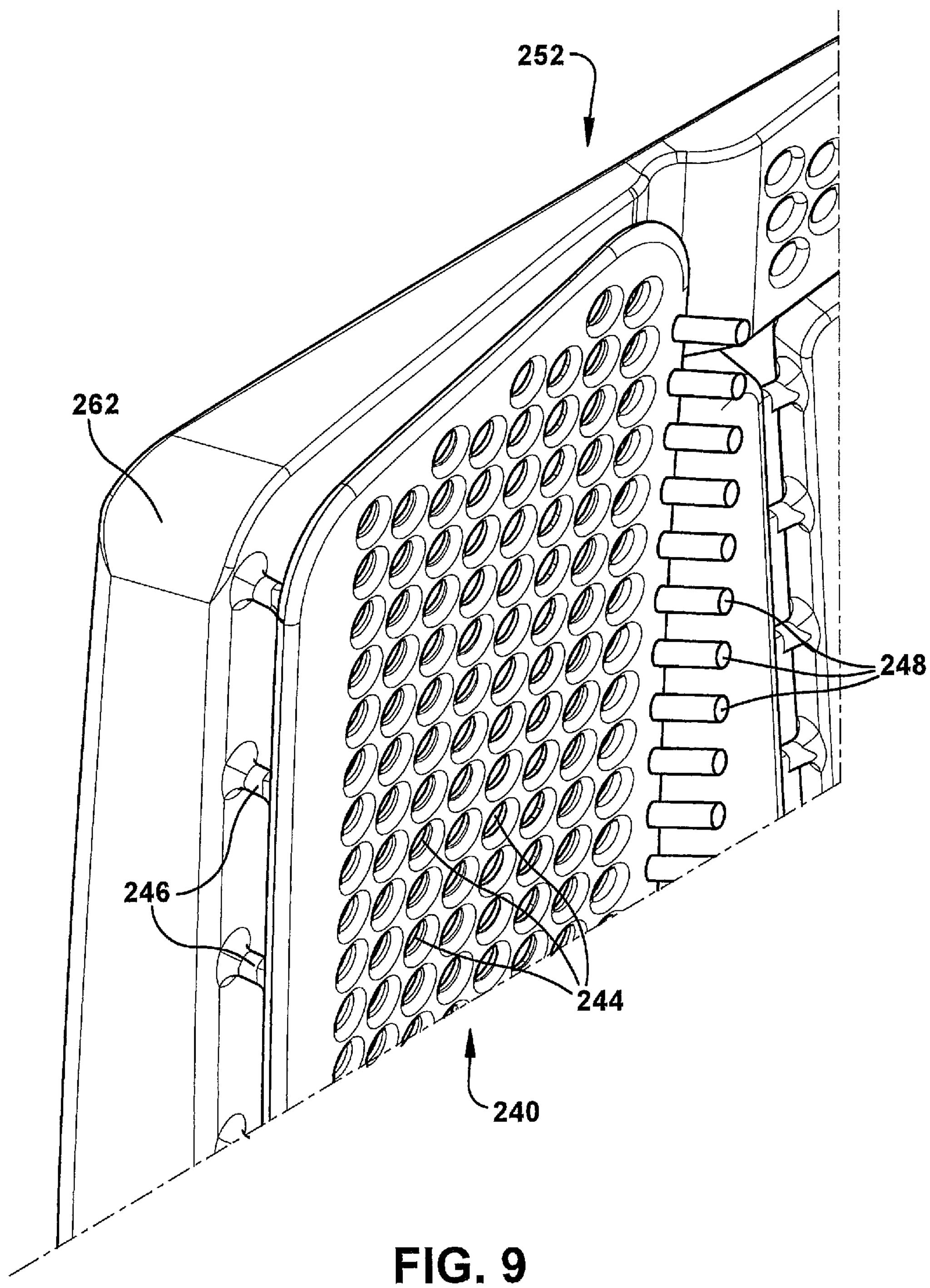
FIG. 9 shows a perspective view of a portion of a pressure side panel of the cooling circuit within a trailing edge according to embodiments of the disclosure.
Figure 10:
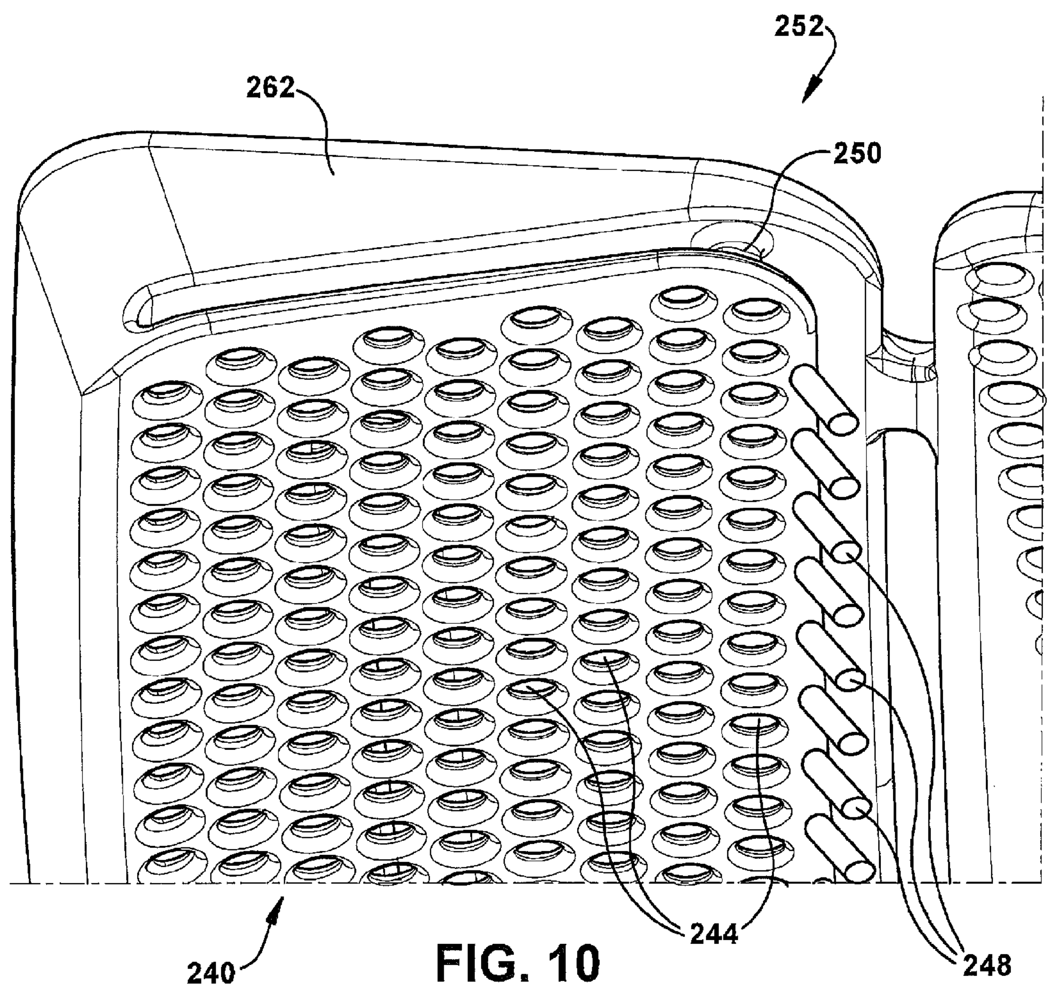
FIG. 10 shows a perspective view of a portion of the pressure side panel of the cooling circuit within a trailing edge according to another embodiment of the disclosure.

Referring back to FIG. 4, cooling circuit 200 may also include a pressure side panel 240. Pressure side panel 240 may extend radially along the entire portion of trailing edge 158 (FIG. 3). In other embodiments, pressure side panel 240 may extend radially along only a portion of trailing edge 158 (FIG. 3). Pressure side panel 240 may include another pin bank cooling arrangement 244. Pin bank cooling arrangement 244 may include a plurality of spaced pins to increase surface area and promote heat transfer. Pressure side panel 240 may be fluidly connected to cooling channel 212. As shown in FIGS. 9-10, pressure side panel 240 may be fluidly connected to cooling channel 212 in various ways. In one embodiment, pressure side panel 240 may be fluidly connected to cooling channel 212 via crossover holes 246 as shown in FIG. 9. In another embodiment, pressure side panel 240 may be open to cooling channel 212 as shown in FIG. 10. Additionally, pressure side panel 240 may include outlets 248 which would release cooling fluid 218 along pressure side 202 of trailing edge 200. A support 250 may also be provided at an axially downstream end 252 of pressure side panel 240 as shown in FIG. 10. Support 250 may extend radially along pressure side panel 240 to stabilize pressure side panel 240. Alternatively, support 250 may include a plurality of spaced supports extending radially along pressure side panel 240 to stabilize pressure side panel 240. Support 250 may be integrally manufactured within a core used to create trailing edge 158 (FIG. 3) and may be composed of the metal used to create trailing edge 158 (FIG. 3). It is to be understood that support 250 may also be employed with the embodiment shown in FIG. 9.

Referring back to FIGS. 4-5, cooling fluid 218 may supplied from the source (not shown) or the cooling circuit (not shown) in leading edge 156 (FIG. 3) and travel radially along cooling channel 212 toward a radially outer end 262 of trailing edge 158 (FIG. 3). As cooling fluid 218 travels along cooling channel 212, some cooling fluid 218 may enter pressure side panel 240 due to pressure side panel 240 being fluidly connected to cooling channel 212 as shown in FIGS. 9-10. Cooling fluid 218 may escape from pressure side panel 240 via outlets 248. The remaining portions of cooling fluid 218 may reach radially outer end 262. At this point, cooling fluid 218 either enters section 220 or is redirected in a radially inward direction through cooling channel 214. As cooling fluid 218 enters section 220, it passes through pin bank cooling arrangement 224 and is released through outlets 226. In this way, section 220 allows for colder cooling fluid 218 (by virtue of the cooling fluid 218 being closer to the source (not shown) of cooling fluid 218) to travel at radially outer end 262 of axially downstream end 208 of trailing edge 200. The remaining cooling fluid 218 from cooling channel 214 is then redirected into cooling channel 216. As cooling fluid 218 travels along cooling channel 216, it may enter section 230 as shown in FIGS. 4-5, i.e., via crossover holes, or FIG. 8, i.e., being open to section 230. As cooling fluid 218 enters section 230, it passes through pin bank cooling arrangement 232 and is released through outlets 234.

Figure 11:
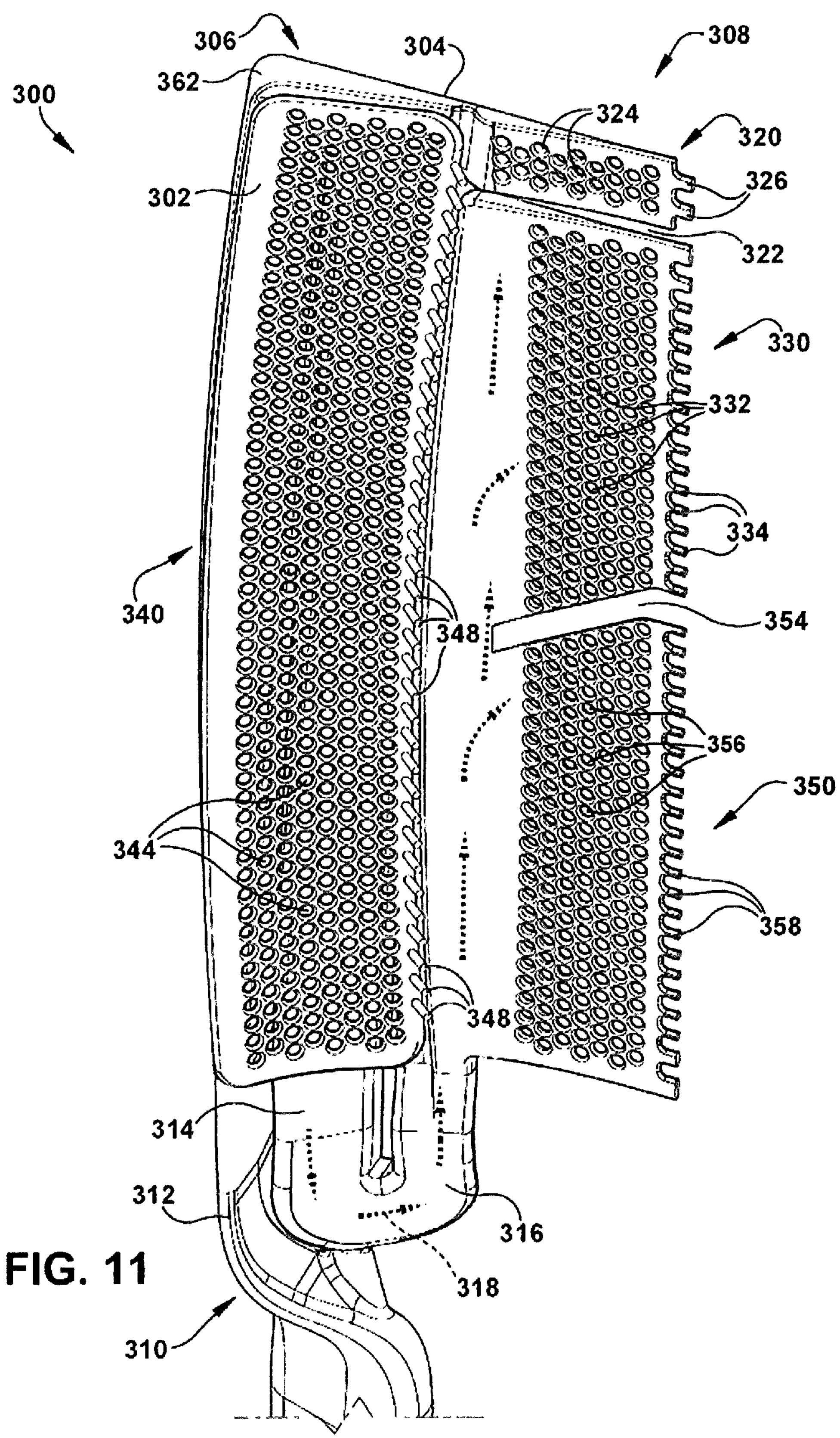
FIG. 11 shows a pressure side view of a cooling circuit within a trailing edge of an airfoil according to another embodiment of the disclosure.

FIG. 11 shows a pressure side view of a cooling circuit 300 of a trailing edge 158 (FIG. 3) according to another embodiment of the disclosure. More particularly, FIG. 11 shows a core used to manufacture trailing edge 158 (FIG. 3) according to another embodiment of the disclosure. In this embodiment, cooling circuit 300 may include three sections having a pin bank cooling arrangements extending along the axially upstream end 306 of trailing edge 158 (FIG. 3). Cooling circuit 300 may include a set of cooling channels 310, sections 320, 330, 350, and a pressure side panel 340. Set of cooling channels 310 may include cooling channel 312, cooling channel 314, and cooling channel 316 as described with reference to FIGS. 4-5. However, it is to be understood that set of cooling channels may include any other number of cooling channels without departing from aspects of the disclosure. Cooling channels 312, 314, 316 may supply cooling fluid 318 (shown by dotted arrows) radially along axially upstream end 306 at suction side 304. Cooling channels 312, 314, 316 may be fluidly connected to one another. That is, cooling channel 312 may receive cooling fluid 318 from cooling channels (not shown) of leading edge 156 (FIG. 3) or from another source configured to supply cooling fluid, e.g., a compressor 102 (FIG. 1).

Cooling circuit 300 of trailing edge 158 (FIG. 3) may also include sections 320, 330, 350. Section 330 may be positioned radially inwardly of section 320. Section 330 may be separated from section 320 via wall (or rib) 322. Section 350 may be positioned radially inwardly of section 330. Section 350 may be separated from section 330 via wall (or rib) 354. This embodiment allows a higher internal pressure to be kept at the root of trailing edge 158 (FIG. 3). Section 320 may include a pin bank cooling arrangement 324. Section 320 may be fluidly connected to cooling channel 312. Section 330 may include a pin bank cooling arrangement 332. Sections 330, 350 may each be fluidly connected to cooling channel 316. Section 350 may also include a pin bank cooling arrangement 356. However, it is to be understood that in embodiments where cooling circuit 300 includes more or less cooling channels than shown in FIG. 11, sections 320, 330, 350 may be fluidly connected to other cooling channels without departing from aspects of the disclosure as described herein. Additionally, sections 330, 350 may be fluidly connected to cooling channel 316 via crossover holes 338 (FIGS. 4-5). Pin bank cooling arrangements 324, 332, 356 may each include a plurality of spaced pins extending from pressure side 302 to suction side 304 to provide increased surface area and promote heat transfer. Sections 320, 330, 350 may include outlets 326, 334, 358 from which cooling fluid 318 may be released from trailing edge 158 (FIG. 3).

Cooling circuit 300 of trailing edge 158 (FIG. 3) may also include a pressure side panel 340. Pressure side panel 340 may extend radially along the entire portion of trailing edge 158 (FIG. 3). In other embodiments, pressure side panel 340 may extend radially along the only a portion of trailing edge 158 (FIG. 3). Pressure side panel 340 may include another pin bank cooling arrangement 344. Pin bank cooling arrangement 344 may include a plurality of spaced pins to increase surface area and promote heat transfer. Pressure side panel 340 may be fluidly connected to cooling channel 312. Pressure side panel 340 may be fluidly connected to cooling channel 312 as shown in FIGS. 9-10, e.g., open to cooling channel 312 or via crossover holes 246. Additionally, pressure side panel 340 may include outlets 348 which would release cooling fluid 318 along pressure side 302. In further embodiments, pressure side panel 340 may include a support 250 (FIG. 10).

Figure 12:
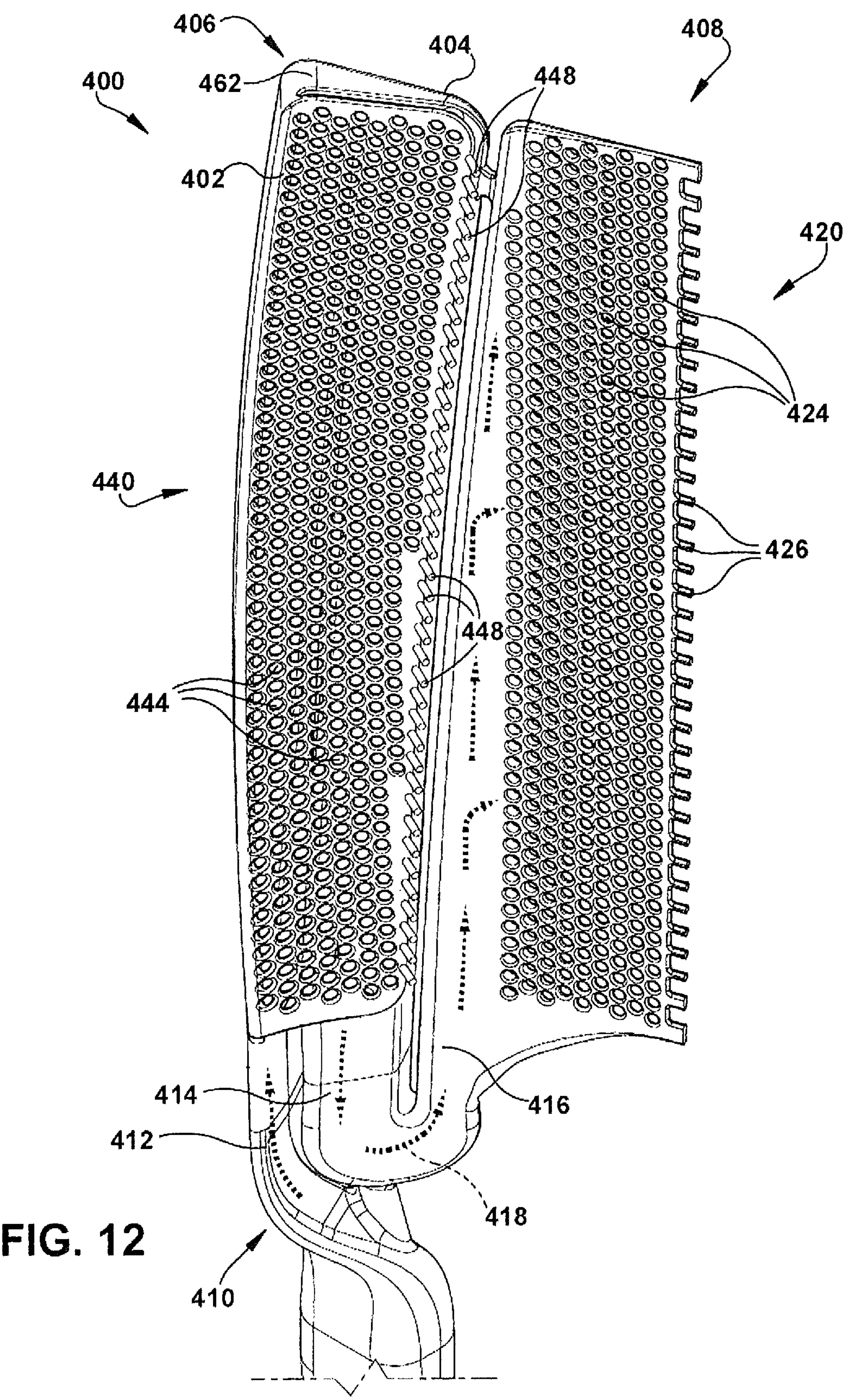
FIG. 12 shows a pressure side view of a cooling circuit within a trailing edge of an airfoil according to another embodiment of the disclosure.

FIG. 12 shows another embodiment of the disclosure, shows a pressure side view of cooling circuit 400 of trailing edge 158 (FIG. 3) according to another embodiment of the disclosure. More particularly, FIG. 12 shows a core used to manufacture trailing edge 158 (FIG. 3) according to another embodiment of the disclosure. In this embodiment, cooling circuit 400 may include only one section having a pin bank cooling arrangement extending along the axially downstream end 408 of trailing edge 400. Trailing edge 400 may include a set of cooling channels 410, a section 420, and a pressure side panel 440. Set of cooling channels 310 may include cooling channel 412, cooling channel 414, and cooling channel 416 as described with reference to FIGS. 4-5. However, it is to be understood that set of cooling channels may include any other number of cooling channels without departing from aspects of the disclosure. Cooling channels 412, 414, 416 may supply cooling fluid 418 (shown by dotted arrows) radially along axially upstream end 406 at suction side 404. Cooling channels 412, 414, 416 may be fluidly connected to one another. That is, cooling channel 412 may receive cooling fluid 418 from cooling channels (not shown) of leading edge 156 (FIG. 3). Alternatively, cooling channels 412, 414, 416 may receive cooling fluid from some other source configured to supply cooling fluid, e.g., a compressor 102 (FIG. 1).

Cooling circuit 400 may also include section 420. Section 420 may extend radially along the entire portion of axial downstream end 408 of trailing edge 158 (FIG. 3). Section 420 may include a pin bank cooling arrangement 424. Section 420 may be fluidly connected to cooling channel 412. However, it is to be understood that in embodiments where cooling circuit 400 includes more or less cooling channels than shown in FIG. 12, section 420 may be fluidly connected to other cooling channels without departing from aspects of the disclosure as described herein. Pin bank cooling arrangement 424 may include a plurality of spaced pins extending from pressure side 402 to suction side 404 to provide increased surface area and promote heat transfer. Additionally, section 420 may be fluidly connected to cooling channel 416 via crossover holes 236 (FIGS. 4-5). Section 340 may include outlets 426 from which cooling fluid 418 may be released from trailing edge 400. This embodiment allows for cooling fluid 418 to use substantially all or majority of its heat capacity since it will travel through a majority of cooling circuit 400.

Cooling circuit 400 may also include a pressure side panel 440. Pressure side panel 440 may extend radially along the entire portion of axially upstream end 406 trailing edge 158 (FIG. 3). In other embodiments, pressure side panel 440 may extend radially along the only a portion of axially upstream end 406 of trailing edge 158 (FIG. 3). Pressure side panel 440 may include another pin bank cooling arrangement 444. Pin bank cooling arrangement 444 may include a plurality of spaced pins to increase surface area and promote heat transfer. Pressure side panel 440 may be fluidly connected to cooling channel 412. Pressure side panel 440 may be fluidly connected to cooling channel 412 as shown in FIGS. 9-10, e.g., open to cooling channel 412 or via crossover holes 446. Additionally, pressure side panel 440 may include outlets 448 which would release cooling fluid 418 along pressure side 402. In further embodiments, pressure side panel 440 may include a support 450 (FIG. 10).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbine airfoil comprising:
a trailing edge having:
a set of cooling channels having a first cooling channel fluidly connected to a second cooling channel;
a first section having a first pin bank cooling arrangement, the first section fluidly connected to the first cooling channel;
a second section having a second pin bank cooling arrangement, the second section fluidly connected to the second cooling channel and being radially inward of the first section; and
a pressure side panel having a third pin bank cooling arrangement, the pressure side panel fluidly connected to the first cooling channel.

2. The turbine airfoil of claim 1, further comprising a first set of crossover holes fluidly connecting the second section to the second cooling channel.

3. The turbine airfoil of claim 2, wherein the first set of crossover holes are angled toward a pressure sidewall of the turbine airfoil.

4. The turbine airfoil of claim 2, further comprising:
a first set of raised features, each raised feature in the first set of raised features corresponding to a crossover hole in the first set of crossover holes and each raised feature in the first set of raised features extending toward a suction sidewall of the turbine airfoil.

5. The turbine airfoil of claim 1, further comprising a third section radially inward of the second section, the third section including a fourth pin bank cooling arrangement and being fluidly connected to the second cooling channel.

6. The turbine airfoil of claim 5, further comprising:
a second set of crossover holes fluidly connecting the third section to the second cooling channel.

7. The turbine airfoil of claim 6, wherein the second set of crossover holes are angled relative to a pressure sidewall of the turbine airfoil.

8. The turbine airfoil of claim 6, further comprising:
a second set of raised features, each raised feature in the second set of raised features corresponding to a crossover hole in the second set of crossover holes and each raised feature in the second set of raised features extending toward a suction sidewall of the turbine airfoil.

9. The turbine airfoil of claim 1, further comprising:
a support at the axially outer end of the pressure side panel.

10. A gas turbine comprising:
a turbine section;
an airfoil within the turbine section, the airfoil including a trailing edge having:
a set of cooling channels having a first cooling channel fluidly connected to a second cooling channel;
a first section having a first pin bank cooling arrangement, the first section fluidly connected to the first cooling channel;
a second section having a second pin bank cooling arrangement, the second section fluidly connected to the second cooling channel and being radially inward of the first section; and
a pressure side panel having a third pin bank cooling arrangement, the pressure side panel fluidly connected to the first cooling channel.

11. The gas turbine of claim 10, further comprising a first set of crossover holes fluidly connecting the second section to the second cooling channel.

12. The gas turbine of claim 11, wherein the first set of crossover holes are angled toward a pressure sidewall of the turbine airfoil.

13. The gas turbine of claim 11, further comprising:
a first set of raised features, each raised feature in the first set of raised features corresponding to a crossover hole in the first set of crossover holes and each raised feature in the first set of raised features extending toward a suction sidewall of the turbine airfoil.

14. The gas turbine of claim 10, further comprising a third section radially inward of the second section, the third section including a fourth pin bank cooling arrangement and being fluidly connected to the second cooling channel.

15. The gas turbine of claim 14, further comprising:
a second set of crossover holes fluidly connecting the third section to the second cooling channel.

16. The gas turbine of claim 14, wherein the second set of crossover holes are angled relative to a pressure sidewall of the turbine airfoil.

17. The gas turbine of claim 14, further comprising:
a second set of raised features, each raised feature in the second set of raised features corresponding to a crossover hole in the second set of crossover holes and each raised feature in the second set of raised features extending toward a suction sidewall of the turbine airfoil.

18. The gas turbine of claim 10, wherein the pressure side panel is fluidly connected to the first cooling channel via a third set of crossover holes.

19. A turbine airfoil comprising:
a trailing edge having:
a set of cooling channels having a first cooling channel fluidly connected to a second cooling channel;
a first section having a first pin bank cooling arrangement, the first section fluidly connected to the second cooling channel; and a pressure side panel having a second pin bank cooling arrangement, the pressure side panel fluidly connected to the first cooling channel.

20. The turbine airfoil of claim 19, wherein the pressure side panel is fluidly connected to the first cooling channel via a third set of crossover holes.

* * * * *